ized Patent [19]

United States Patent [19]

Black

[11] 3,945,453
[45] Mar. 23, 1976

[54] SPRING POWER CELL FOR VEHICULAR SPRING MOTOR

[76] Inventor: Jerimiah B. Black, 2065 Church Creek Drive, Charleston, S.C. 29407

[22] Filed: Oct. 23, 1974

[21] Appl. No.: 517,237

[52] U.S. Cl. ............... 180/54 R; 185/11; 185/40 H; 185/45
[51] Int. Cl.² ............................ B60K 9/02
[58] Field of Search .... 180/54 R; 185/37, 39, 40 H, 185/9, 10, 11, 12, 13, 14, 45, 40 R; 160/318, 317, 316, 315, 313

[56] References Cited
UNITED STATES PATENTS

| | | | |
|---|---|---|---|
| 382,033 | 5/1888 | Dohis | 185/45 X |
| 695,430 | 3/1902 | Haas | 185/40 H |
| 1,217,935 | 3/1917 | Gephart | 185/40 H |
| 1,721,807 | 7/1929 | Eisiminger et al. | 185/40 H |
| 1,833,838 | 11/1931 | Joyner | 185/11 |
| 2,566,755 | 9/1951 | Vigneri | 185/39 |
| 3,589,464 | 6/1971 | Katchamakoff | 180/54 R |

FOREIGN PATENTS OR APPLICATIONS 1,025,680  3/1958  Germany ............................ 185/39

*Primary Examiner*—M. H. Wood, Jr.
*Assistant Examiner*—Milton L. Smith
*Attorney, Agent, or Firm*—Wigman & Cohen

[57] ABSTRACT

A spring motor for providing motive power for vehicles, in particular automobiles, golf carts and the like, includes a plurality of interconnected spirally-wound spring power cells arranged in parallel relation in a supporting frame. Individual power cells are adapted to be wound in situ independently by manual means or collectively by motorized means.

11 Claims, 10 Drawing Figures

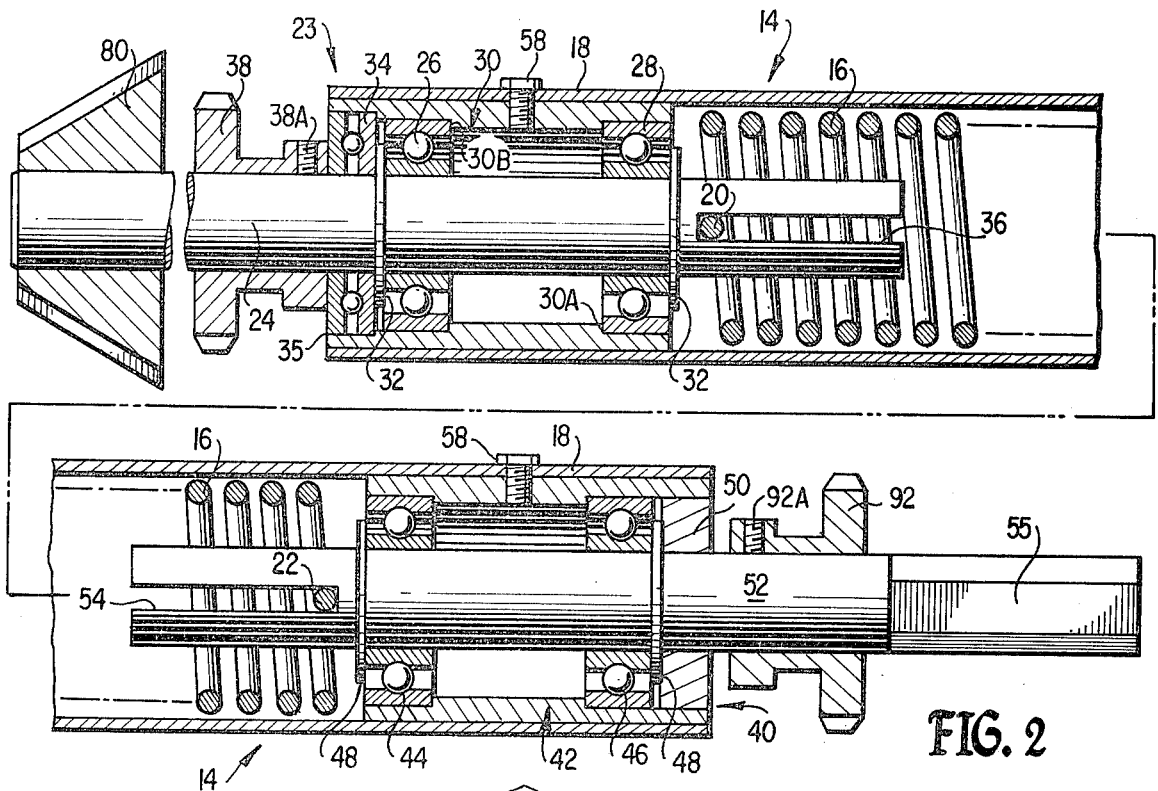
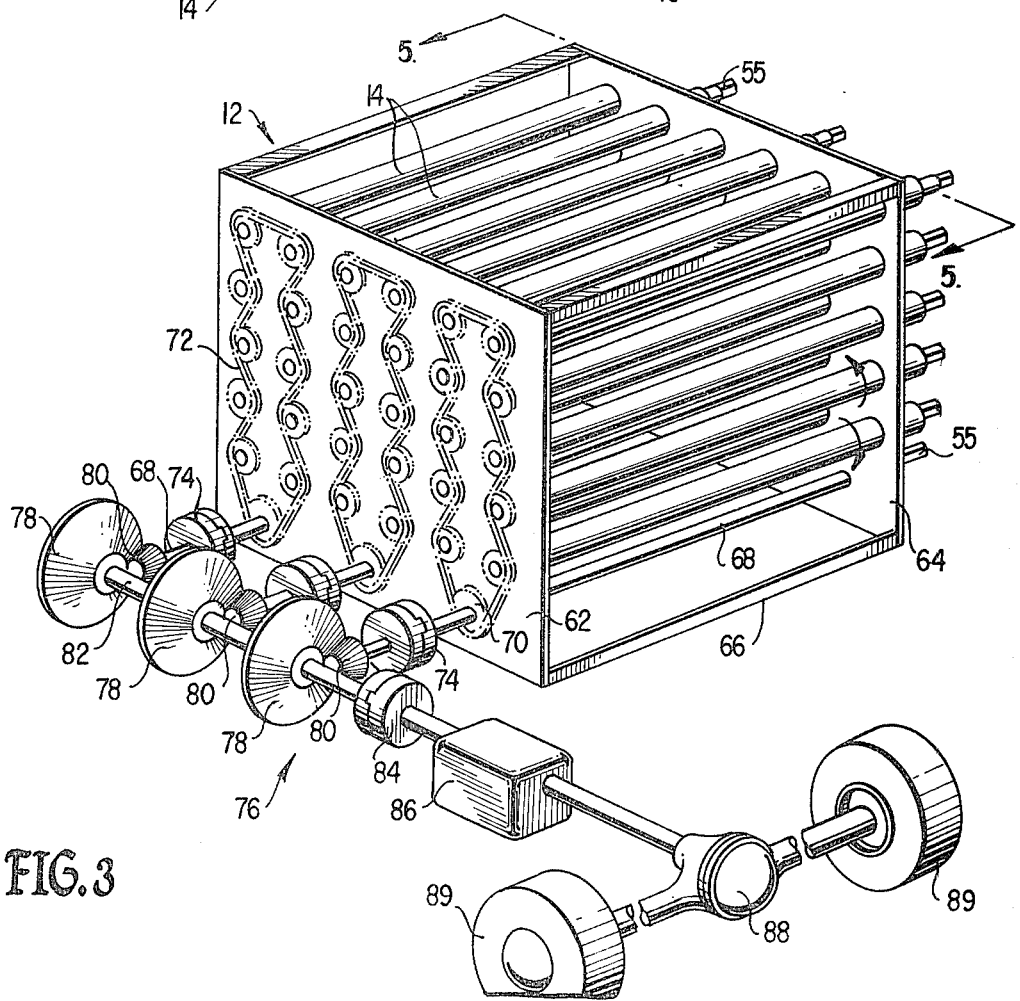

SPRING POWER CELL FOR VEHICULAR SPRING MOTOR

BACKGROUND OF THE INVENTION

1. Field of the Invention

The present invention relates to spring power cells. More particularly, the present invention relates to an improved spring motor for powering vehicles, such as automobiles, golf carts and the like.

2. The Prior Art

Many examples of the use of springs for providing motive power for vehicles can be found in the prior art. One such example is shown in U.S. Pat. No. 3,589,464 which discloses a vehicle equipped with a spring motor having a plurality of replaceable spring power cartridge. Through suitable gearing, the power cartridges drive a central gear and associated drive train as the coiled springs unwind. Typically, as noted in the aforementioned patent, heavy-duty springs are utilized in vehicular spring motors to store sufficient energy to make such motors feasible. Heavy-duty springs are, however, difficult to rewind without either a motor-driven or high mechanical advantage manual rewind apparatus. One solution to this problem proposed by the patentee of U.S. Pat. No. 3,589,464 is to provide the spring motor with replaceable cartridges which may be carried aboard the vehicle and inserted in place of spent cartridges whenever necessary. The spent cartridges may then be rewound when rewind machinery becomes available. Of course, one disadvantage of this arrangement is that a sufficient number of additional spring cartridges must be carried aboard the vehicle to permit the vehicle transit between rewind stations. More significantly, however, care must be exercised to insure that the spring cartridges are wound to substantially the same force and that no partially wound cartridges are used concurrently with fully wound cartridges. Otherwise, it is possible to expend spring power in oppositely winding a spent cartridge.

Other early examples of prior art spring-driven vehicles can be found in U.S. Pat. Nos. 695,430 and No. 1,217,935 which disclose spring motors having a plurality of coiled springs coaxially arranged on a common shaft and manual rewind means, While the foregoing disadvantages of a spring-driven vehicle with replaceable spring cartridges are obviated by the latter machines, so long as the springs are wound to substantially the same tension, a broken coil spring may cause a similar adverse effect; that is, oppose the driving force of the intact, fully-wound springs. Moreover, the inherent inaccessibility of the coiled springs of the vehicles described in U.S. Pats. Nos. 695,430 and 1,217,935 adds significantly to the difficulty and expense of replacing broken or damaged springs. More importantly, the spring-driven vehicles of the prior art are unable to retain sufficiently wound force to enable the vehicle to travel very far.

In view of the foregoing, it should be apparent that there still exists a need in the art for a vehicular spring motor capable of delivering substantial power from a plurality of spring power elelments which may be readily and individually rewound either by a simple manual means or collectively by motor driven means, which are readily accessible and arranged for easy replacement of broken or damaged springs and which, upon failure or having its energy spent an individual spring power element will not oppose the driving force of the remaining spring elements. The nature of the construction of these power cells make it impossible to reverse wind the springs by any method within normal use. It is, therefore, a primary object of this invention to provide an improved spring motor for driving vehicles, such as automobiles, golf carts and the like.

More particularly, it is an object of the present invention to provide a spring-driven golf cart vehicle capable of storing sufficient spring energy for at least one round of golf.

Still more particularly, it is an object of this invention to provide a vehicular spring motor which includes a plurality of individual spiral spring power cells arranged in parallel relation in a plurality of co-operating rows and interconnected by a sprocket chain.

Another object of this invention is to provide an improved spring power cell combining economical spiral springs into a single unit to store energy for running a vehicle.

Yet another object of this invention is to provide a spring motor having a plurality of novel spring power cells, each constructed and arranged so that, should a single power cell fail, it will not oppose the driving force of the remaining power cells, being protected from doing so by the use of ratches or sprag clutches at the wind end of each cell.

Still another object of this invention is the provision of a spring power motor having a plurality of power cells, each of which is readily accessible for replacement.

It is still a further object of the present invention to provide vehicular spring motors of relatively large variations of power capacities utilizing motor driven rewind mechanisms as well as smaller rewind mechanisms not requiring a high mechanical advantage.

Other objects, features and advantages of this invention will be evident from the foregoing detailed description and accompanying drawings.

SUMMARY OF THE INVENTION

Briefly described, these and other objects of the invention are accomplished in accordance with this invention by a motor comprising a plurality of spring power cells, each of which includes an elongated right or left-hand wound spiral spring disposed concentrically within a tubular housing. A journaled drive shaft, supported by ball bearings and locked in place, extends axially into one end of the housing and releasably engages one end of the spring. A journaled wind shaft which is also supported by ball bearings is similarly disposed and engaged at the opposite end of the spring. Both the drive shaft and the wind shaft are housed in a tubular collar or sleeve which also accomodates the ball bearings of each shaft. The collars or sleeves containing the drive shafts and the wind shafts each constitute an assembly or cell and are easily removed from the motor. A sprocketwheel is fixedly secured in axial relation on the outwardly extending end of the driveshaft. The wind shaft is provided with means to prevent unwinding of the spiral spring, and on the outward extremity of the wind shaft is means for engaging a rewind apparatus.

A plurality of such spring power cells are mounted in a supporting frame arranged in at least two parallel rows of alternating right and left-hand wound cells, the drive and wind shaft extremities extending from respective end plates of the frame. A power transmission shaft, journaled at its ends in each end plate along an axis parallel to the power cell rows and in a median plane therebetween, has, axially affixed to the driving end thereof, a main sprocket wheel in the plane of the drive shaft sprocket wheels. The drive shaft sprocket wheels are interconnected by a chain in zig-zag fashion with the power shaft sprocket wheel such that each right-hand and left-hand wound power cell will cause rotation of the power shaft in the same direction as it unwinds. The power is delivered through the sprocket and chain to a master shaft which receives the power from a group of power cells. The master power shaft is one of as many master power shafts (each with its groups of power cells) as may be necessary to accomplish the power needed to drive a particular vehicle. Each of these power shafts conveys the power it receives to the other power shafts in the assembly by means of heavier duty chains and sprockets. Thus, the total accumulated power of a complete assembly can be taken from any of the power shafts.

It is worthwhile to note the fact that there is no limit to the size of the power cell or to the number of cells which may be used in an assembly, excepting limitations of vehicle size. The force of the unwinding spiral springs may thereafter be transmitted to the wheels of a vehicle through a conventional drive train which may include suitable clutches, a transmission, and differential gears. In one embodiment the power may be transmitted from either end of the assembly or at any point on the power shaft. An important aspect of this invention is, therefore, this novel utilization of a spirally wound spring element in a vehicular spring motor.

Should one of the springs fail or fracture at either the wind shaft or the drive shaft engaging portion, it is obvious that the spring would present no opposing torque to the unwinding of the remaining power cells. However, upon noting a spring failure, replacement is accomplished by simply removing the wind shaft, its bearing assembly and the defective spring. A new spring may then be installed with ease and the same wind shaft and same bearing assembly replaced for continued use.

BRIEF DESCRIPTION OF THE DRAWINGS

FIG. 2 is a broken plan view partly in section, showing an embodiment of a single spring power cell constructed in accordance with this invention.

FIG. 3 is a perspective view of an embodiment of the invention showing an arrangement of a plurality of power cells arranged in an assembly of multiple sets to drive a single drive train.

DETAILED DESCRIPTION OF THE INVENTION

Figure 1:
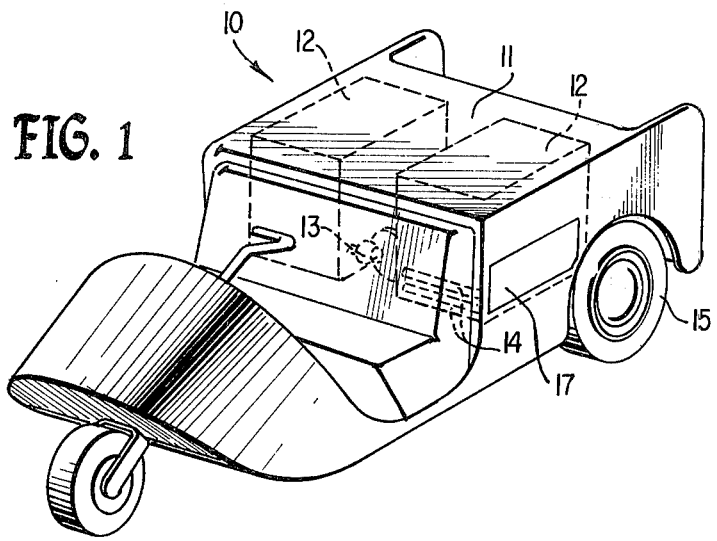
FIG. 1 is a view in perspective of a golf cart vehicle showing in broken lines one arrangement of two spring motor assemblies in accordance with the present invention.

Referring now in detail to the drawings, wherein like parts are represented throughout with like reference numerals, FIG. 1 shows an embodiment of a golf cart vehicle 10. Located in the motor compartment 11 is a source of motive power comprising a pair of spring power cell assemblies 12, each including a plurality of spring power cells 14 constructed in accordance with the teachings of the present invention and as shown in particular in FIG. 2. The power cell assemblies 12 are arranged through a suitable drive train 13 (partly shown) to drive at least one rear wheel 15 of the golf cart and obviously other vehicles. The spring power cell assemblies 12 are rewound through rewind door 17.

Referring nore specifically to FIG. 2, which ilustrates the construction of an individual spring power cell 14, an elongated spirally-wound spring 16 is concentrically disposed interiorly of a tubular spring housing 18 and in close proximity to the internal wall thereof. Each end of the spring 16 is provided with a straight portion 20, 22 extending transversely of the axis of the spring housing 16, the purpose of which will be subsequently described herein. While the invention is not intended to be limited thereby, a preferred form of the spiral spring for use in assemblies for golf carts has a length of about 24 inches and is wound of ⅛-inch diameter spring steel wire.

At the drive end 23 of the spring power cell 14, a drive shaft 24 is journaled in a pair of axially-spaced bearings 26, 28 of bearing collar assembly 30. A pair of retainer rings 32 prevent axial movement of the drive shaft 24 with respect to the bearing collar assembly 30. Bearing assembly collar 30 is machined so as to allow a press fit of the bearings into the collar at both ends until the bearings come to rest securely against undersized shoulders 30A and 30B. Thrust bearing 34 is axially disposed in a recess 35 on the outwardly facing end of bearing assembly 30. Thrust bearing 34 is used only in those power cells utilized as "master cells" (the only cells used to transmit power to the main power shaft) which directly drive bevel gear 80. The inwardly disposed end of the drive shaft 24 extends somewhat beyond the bearing 28 as shown, and is provided with an axially extending slot 36 which engages the straight portion 20 of spring 16. Keyed to the other end of drive shaft 24 is a sprocket wheel 38 positioned in abutting relationship to thrust bearing 34. Sprocket 38 is keyed in place by set screw 38A. Both bearing assembly collars, drive collar 30 and wind collar 42, are locked in place by screws 58 which extend through the tubular spring housing 18 and are threaded into the collars 30, 42.

The wind end 40 of the spring power cell 14 is arranged similarly to the drive end 23 with a bearing assembly collar 42, spaced roller or ball bearings 44, 46, retainer rings 48 and braking mechanism 50. The breaking mechanism may be of the well-known ratchet and pawl type for the individual cells or of the sprag clutch type (not shown) described in FIg. 9. Wind shaft 52 is journaled in bearings 44, 46 and is provided on its inwardly disposed end with axial slot 54 which engages the straight portion 22 of spring 16. The other end of wind shaft 52 extends axially through a recessed area in bearing collar assembly 42 which allows for braking mechanism 50. Further outward on the wind shaft is rewind sprocket 92 held in place by set screw 92A. This rewind sprocket is used for multiple winding of cell 14. Winding shaft 52 extends far enough to attach a winding mechanism to its end which may preferably be hexagonal sided, shown by reference numeral 55. It is obviously not necessary to rewind each cell individually as described elsewhere herein, so only those drive shafts to be used for rewinding need be longer than is needed to accomodate rewind sprocket 92.

Brake mechanism 50 may be constructed in accordance with any appropriate design for preventing retrograde movement of the wind shaft 52 as the spring 16 is wound, such as, for example, a ratchet engaged by a spring-loaded pawl. The rewinding mechanism may be a manually-operated crank or an electric motor which are adapted to engage the outward end 55 of wind shaft 52.

FIG. 3 shows a preferred embodiment of the invention wherein a spring power cell assembly 12 is provided with 30 spring power cells 14 arranged in three groups of 10 cells each. The cells 14 of each group are mounted between end plates 62, 64 of frame 66 in two parallel rows of alternating right and left-hand wound cells. Power transmission shafts 68 are centrally disposed beneath the two rows of each group of cells 14 and in parallel relation thereto. The ends of each shaft 68 are journaled in roller bearings (not shown) in the end plates 62, 64. Main sprocket wheel 70, mounted on each shaft 68 in the plane of the sprocket wheels 38 of a group of cells 14, is interconnected with wheels 38 by a chain 72 in such a way that both the right and left-hand wound springs of the cells urge the sprocket wheel 70 in the same rotational direction. Each shaft 68 is further provided with an auxiliary clutch 74 which operates in a well-known manner. The remainder of the drive train 76 is conventional and may include bevel gears 78 and pinions 80 arranged in axially-spaced relation on main drive shaft 82, which may further be provided with a main clutch 84, transmission 86, differential 88, and driven wheels 89. The outward end of each shaft 52 has, when designated as a rewind shaft, a hexagonally-shaped extremity 55 for engagement with a motor-driven rewind apparatus (not shown) which may be, for example, a D-C electric motor or an A-C electric motor.

Figure 4:
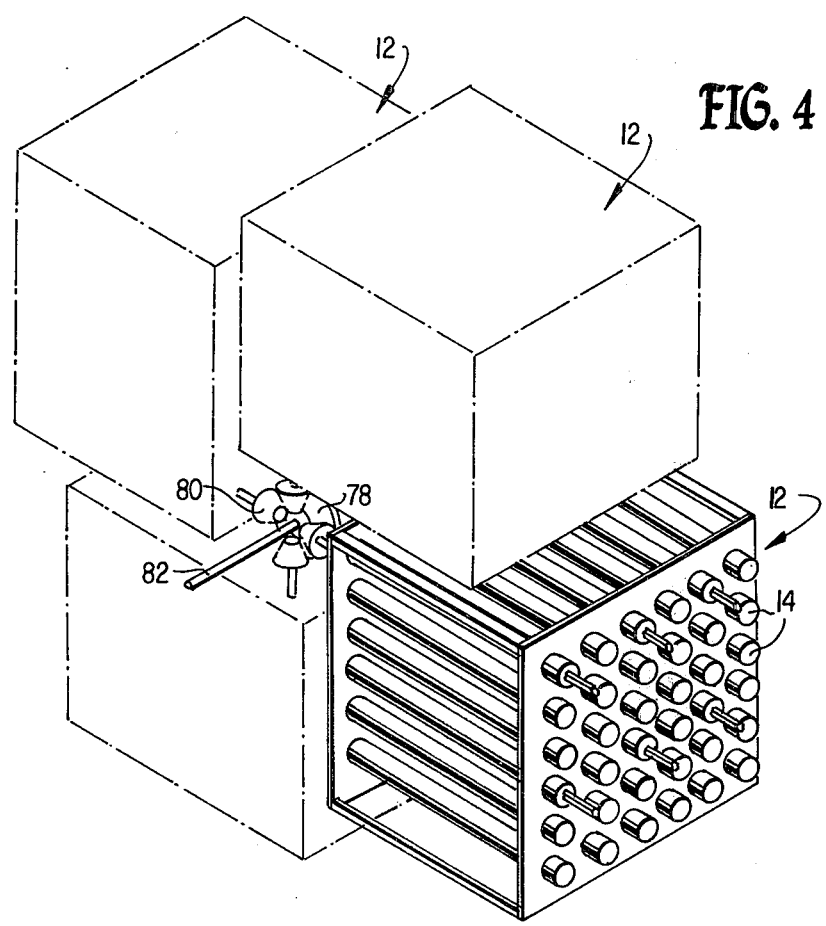
FIG. 4 is a schematic view in perspective of another embodiment of the invention showing four assemblies arranged to drive a single drive shaft.
Figure 5:
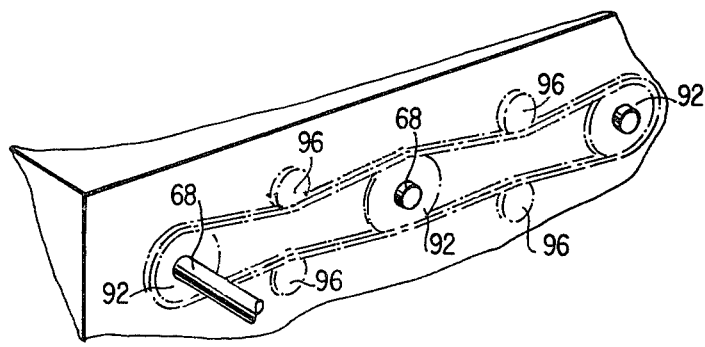
FIG. 5 is a view in perspective of an embodiment of a single drive shaft rewind arrangement taken along line 5—5 of FIG. 3.

FIG. 4 illustrates another preferred embodiment of the invention wherein four spring power cell assemblies 12 are arranged to rotate main drive shaft 82 through appropriate bevel gears 78 and pinions 80. It will be appreciated by those skilled in the art that a greater or lesser number of spring power cells may be utilized in a spring power cell assembly and that other arrangements and details of such assemblies and drive trains are possible. For example, as shown in FIg. 5, the wind ends of the power transmission shafts 68 are, according to this embodiment, provided with rewind sprockets 92. Rewind chain 94 meshes with the rewind sprockets 92 and idler sprockets 96 such that all the spring power cells of a spring power cell assembly may be simultaneously rewound by a motor-driven means (not shown).

Figure 6:
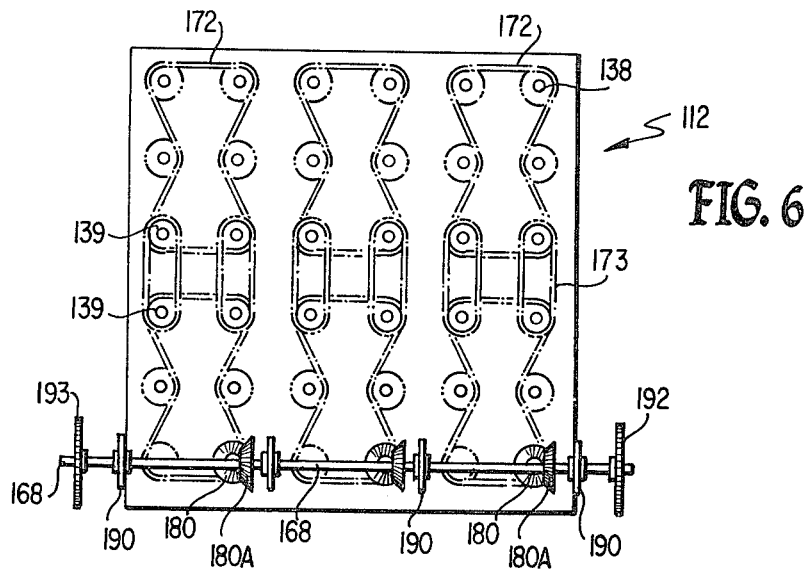
FIG. 6 is a plan view of an embodiment of the invention showing an arrangement of a plurality of power cells arranged in an assembly with the main drive shaft at a right angle to the assembly.

FIG. 6 shows an alternative embodiment of the invention wherein a spring power assembly 112 is provided with 36 power cells. The embodiment of FIG. 6 differs from that of FIg. 3 in that the main power shaft 168 is disposed at a right angle to the spring power cell assembly. Bevel gears 180 are mounted on cell drive shafts (not shown) extending through end plate 162. Power from sprocket wheels 138, and double sprocket wheels 139 is transferred by meshing chains 172 and transfer chains 173 in a manner similar to that described in FIg. 3 to bevel gears 180. Bevel gears 180A are arranged on power shaft 168 in axially spaced relationship with bevel gears 180. Main power shaft 168 is held in place by main shaft mounting bearings 190. This arrangement is a space saver and will allow the power take-off from either end of the main power shaft 168, shown by power take-off sprocket 192 or power gear 193.

Figure 7:
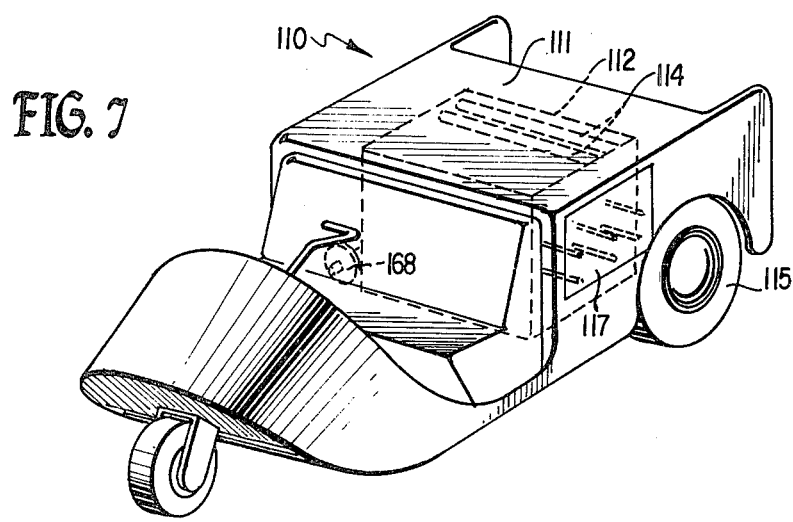
FIG. 7 is a perspective view of a golf cart vehicle showing in broken line arrangement the single assembly of FIG. 6.

The space saving spring power assembly may be used as shown in FIG. 7 which shows an embodiment of a golf cart vehicle 110. Located in motor compartment 111 is the single spring power assembly 112 as shown in the embodiment of FIG. 6, including a plurality of individual power cells 114. Power is delivered through a main drive shaft 168 to a power train (not shown) to drive rear wheel 115.

Figure 8:
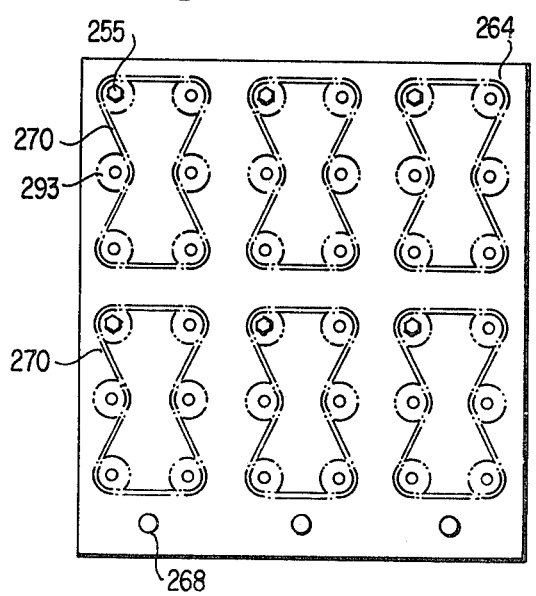
FIG. 8 is a plan view showing another embodiment of the power transfer.

Referring now to FIG. 8, there is shown an alternative arrangement to FIG. 5 for rewinding at the opposite end of the assembly 112 as the power take-off. The individual power cells extend through end plate 264 where each is ended with a sprocket wheel 293, or double sprocket wheels and rewind hexagonal endings 255. The assembly is thus rewound from each of the six hexagonally-shaped endings 255 by transmitting rewind energy through chains 270 which mesh with the sprocket wheels 293.

Figure 9:
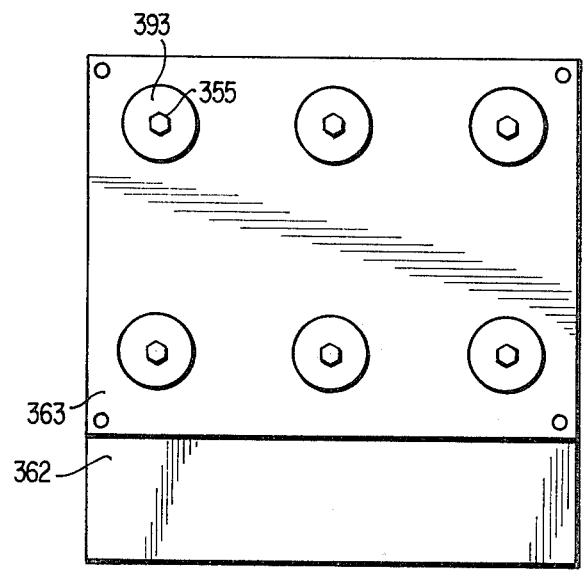
FIG. 9 is a plan view showing a clutch plate arrangement.

FIG. 9 shows a sprag clutch plate arrangement adapted for use with a power cell assembly. The clutch mounting plate 363 is spaced from end plate 362 and securely retains sprag clutches 393 in openings therethrough. The wind shafts of this arrangement are each provided with hexagonal extremities 355.

Figure 10:
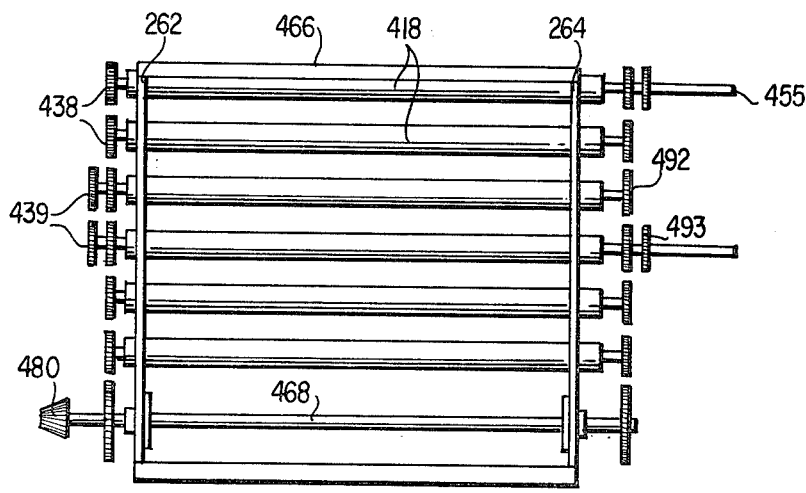
FIG. 10 is a side view of yet another embodiment showing as assembly of power cells.

In FIG. 10 there is shown a side view of FIg. 8 having rewind at the end opposite the drive end. Tubular spring housings 418 are shown extending through end plates 262, 264 to sprocket wheels 438, double sprocket wheels 439 and sprocket wheels 492 and double sprocket wheels 493 respectively. The chains (not shown) supply power to power shaft 468 and transfer that power through rear bevel gear 480. Rewind is accomplished through shaft 455.

From the foregoing description, the construction and operation of a spring motor according to this invention will be apparent. It is to be noted, however, that according to an important operational feature of the invention, the spring power cells may be rewound collectively with either an electric motor-driven rewind means or independently with a manual crank. If the operator so desires, he need only wind a portion of the spring power cells. Spent power cells will not oppose the driving force of fully or partially wound cells. The spent cells just turn freely because they would be turning in the opposite direction from the direction the ratchet or clutch would be set to hold.

Many modifications and variations of the present invention, other than those described herein, are possible in light of the above teachings and within the purview of the appended claims without departing from the spirit and intended scope of the invention.

What is claimed:

1. A spring power cell for providing motive power to a vehicular spring motor comprising:
   an elongated tubular housing having a drive end and a wind end;
   a spirally-wound spring element concentrically disposed interiorly of said housing;
   a journaled drive shaft axially disposed at the drive end of said housing and extending partially thereinto:
   a first axial slot disposed at the inwardly extending end of said drive shaft for releasably engaging one end of said spring element;
   a journaled wind shaft axially disposed at the wind end of said housing and extending partially thereinto; and
   a second axial slot disposed at the inwardly extending end of said wind shaft for releasably engaging the other end of said spring element.

2. A spring power cell assembly comprising:
   a frame;
   a plurality of spring power cells fixedly mounted in side-by-side relation to said frame in parallel rows, said spring power cells each comprising an elongated housing having a drive end and a wind end, a spirally-wound spring element concentrically arranged relative to said housing, a journaled drive shaft axially mounted at the drive end of said housing, a first spring engaging means coupled to said drive shaft for releasably engaging one end of said spring element, a journaled wind shaft axially mounted at the wind end of said housing, a second spring engaging means coupled to said wind shaft for releasably engaging the other end of said spring element;
   a power transmission shaft rotatably mounted in said frame adjacently of said cells and parallel thereto, one end of said power transmission shaft including means for releasably engaging a spring rewind device; and
   interconnecting means at the other end of said power transmission shaft for operatively interconnecting said power transmission shaft to at least two of said parallel rows of spring power cells.

3. A spring power cell assembly according to claim 2, wherein said at least two parallel rows of spring power cells include spring power cells having left-hand and right-hand spirally-wound spring elements, said interconnecting means being arranged to interconnect the spring power cells of said two parallel rows such that the spring power cells thereof cumulatively urge said power transmission shaft in the same rotational direction.

4. A spring power cell assembly according to claim 3, wherein said interconnecting means comprises a sprocket wheel affixed to the drive shaft of each of said spring power cells of said at least two rows, a main sprocket wheel axially affixed to said other end of said power transmission shaft, and a chain meshed with said main sprocket wheel and said sprocket wheels and arranged such that when said spirally-wound spring elements unwind, each sprocket wheel imparts a force through said chain to said main sprocket wheel in the same rotational direction.

5. A spring power cell assembly according to claim 2 wherein said plurality of spring power cells are arranged in at least two groups of two parallel rows and including a power transmission shaft and interconnecting means associated with each of said groups, the spring power cells of said two parallel rows of each group including power cells having left-hand and right-hand spirally-wound spring elements, the interconnecting means associated with each of said groups being arranged to interconnect the spring power cells of the associated group such that the spring power cells thereof cumulatively urge the associated power transmission shaft in the same rotational direction.

6. A spring power cell assembly according to claim 5, including means for interconnecting said one end of each of said power transmission shafts to thereby permit simultaneous rewinding of said plurality of spring power cells.

7. A spring power cell assembly according to claim 2 wherein the spirally-wound spring element of each of said spring power cells is disposed interiorly of its respective housing, said drive shaft and wind shaft extending partially into said housing and having a axial slot at the inwardly extending ends thereof for releasably engaging the ends of said spring element.

8. A spring power cell assembly according to claim 2, wherein the outwardly extending end of each wind shaft of said spring power cells includes means for releasably engaging a spring rewind device so that each spring power cell may be individually rewound and means coupling the wind shafts of each spring power cell of said at least two parallel rows for cumulatively rewinding the spring power cells of said at least two parallel rows.

9. A spring motor powered vehicle comprising:
   a vehicle having wheels;
   a frame mounted to said vehicle; and
   a spring power cell assembly comprising a plurality of spring power cells fixedly mounted in side-by-side relation to said frame in parallel rows, said spring power cells each comprising an elongated housing having a drive end and a wind end, a spirally-wound spring element concentrically arranged relative to said housing, a journaled drive shaft axially mounted at the drive end of said housing, a first spring engaging means coupled to said drive shaft for releasably engaging one end of said spring element, a journaled wind shaft axially mounted at the wind end of said housing, a second spring engaging means coupled to said wind shaft for releasably engaging the other end of said spring element, a power transmission shaft rotatably mounted in said frame adjacently of said cells and parallel thereto, one end of said power transmission shaft including means for releasably engaging a spring rewind device, interconnecting means at the other end of said power transmission shaft for operatively interconnecting said power transmission shaft to at least two of said parallel rows of spring power cells, said power transmission shaft being operatively connected to at least one of said vehicle wheels.

10. A spring motor powered vehicle according to claim 9 including drive train means having at least one clutch and interposed between and operatively connecting said power transmission shaft to said at least one of said vehicle wheels.

11. A spring motor powered vehicle according to claim 9 including a plurality of spring power cell assemblies.

* * * * *

UNITED STATES PATENT AND TRADEMARK OFFICE
CERTIFICATE OF CORRECTION

PATENT NO. : 3,945,453
DATED : March 23, 1976
INVENTOR(S) : Jerimiah B. Black

It is certified that error appears in the above-identified patent and that said Letters Patent are hereby corrected as shown below:

Column 1, line 17, change "cartridge" to --cartridges--;

Column 1, line 45, after "means" change "," (comma) to --.-- (period);

Column 1, line 62, change "elelments" to --element--;

Column 4, line 6, change "as" to --an--;

Column 4, line 23, change "ilustrates" to --illustrates--;

Signed and Sealed this

Twenty-fourth Day of August 1976

[SEAL]

Attest:

RUTH C. MASON
*Attesting Officer*

C. MARSHALL DANN
*Commissioner of Patents and Trademarks*